US008601237B2

(12) United States Patent
Archer et al.

(10) Patent No.: US 8,601,237 B2
(45) Date of Patent: *Dec. 3, 2013

(54) PERFORMING A DETERMINISTIC REDUCTION OPERATION IN A PARALLEL COMPUTER

(71) Applicant: International Business Machines Corporation, Armonk, NY (US)

(72) Inventors: Charles J. Archer, Rochester, MN (US); Michael A. Blocksome, Rochester, MN (US); Joseph D. Ratterman, Seattle, WA (US); Brian E. Smith, Knoxville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/672,740

(22) Filed: Nov. 9, 2012

(65) Prior Publication Data

US 2013/0290673 A1     Oct. 31, 2013

Related U.S. Application Data

(63) Continuation of application No. 12/790,037, filed on May 28, 2010, now Pat. No. 8,489,859.

(51) Int. Cl.
*G06F 15/76*     (2006.01)
(52) U.S. Cl.
USPC ........................................................ 712/30
(58) Field of Classification Search
None
See application file for complete search history.

(56) References Cited

U.S. PATENT DOCUMENTS

| 5,105,424 | A | 4/1992 | Flaig et al. |
| 5,333,279 | A | 7/1994 | Dunning |
| 5,513,371 | A | 4/1996 | Cypher et al. |
| 5,541,914 | A | 7/1996 | Krishnamoorthy et al. |
| 5,832,215 | A | 11/1998 | Kato et al. |

(Continued)

FOREIGN PATENT DOCUMENTS

EP     1835414 A2     9/2007

OTHER PUBLICATIONS

Notice of Allowance, U.S. Appl. No. 12/124,763, Oct. 3, 2012.
Final Office Action, U.S. Appl. No. 12/124,745, Nov. 23, 2012.

(Continued)

*Primary Examiner* — Andrew Caldwell
*Assistant Examiner* — Benjamin Geib
(74) *Attorney, Agent, or Firm* — Bigger & Ohanian, LLP

(57) ABSTRACT

Performing a deterministic reduction operation in a parallel computer that includes compute nodes, each of which includes computer processors and a CAU (Collectives Acceleration Unit) that couples computer processors to one another for data communications, including organizing processors and a CAU into a branched tree topology in which the CAU is a root and the processors are children; receiving, from each of the processors in any order, dummy contribution data, where each processor is restricted from sending any other data to the root CAU prior to receiving an acknowledgement of receipt from the root CAU; sending, by the root CAU to the processors in the branched tree topology, in a predefined order, acknowledgements of receipt of the dummy contribution data; receiving, by the root CAU from the processors in the predefined order, the processors' contribution data to the reduction operation; and reducing, by the root CAU, the processors' contribution data.

6 Claims, 9 Drawing Sheets

(56) References Cited

U.S. PATENT DOCUMENTS

| | | |
|---|---|---|
| 5,878,241 A | 3/1999 | Wilkinson et al. |
| 5,892,923 A | 4/1999 | Yasuda et al. |
| 5,937,202 A | 8/1999 | Crosetto |
| 5,949,988 A | 9/1999 | Feisullin et al. |
| 6,000,024 A | 12/1999 | Maddox |
| 6,067,609 A | 5/2000 | Meeker et al. |
| 6,076,131 A | 6/2000 | Nugent |
| 6,272,548 B1 | 8/2001 | Cotter et al. |
| 6,289,424 B1 | 9/2001 | Stevens |
| 6,480,885 B1 | 11/2002 | Olivier |
| 6,834,301 B1 | 12/2004 | Hanchett |
| 6,982,960 B2 | 1/2006 | Lee et al. |
| 7,143,392 B2 | 11/2006 | Ii et al. |
| 7,203,743 B2 | 4/2007 | Shah-Heydari |
| 7,284,033 B2 | 10/2007 | Jhani |
| 7,352,739 B1 | 4/2008 | Rangarajan et al. |
| 7,555,566 B2 | 6/2009 | Blumrich et al. |
| 7,613,134 B2 | 11/2009 | Rangaraajan et al. |
| 7,673,011 B2 | 3/2010 | Archer et al. |
| 7,697,443 B2 | 4/2010 | Archer et al. |
| 7,725,329 B2 | 5/2010 | Kil et al. |
| 7,774,448 B2 | 8/2010 | Shah-Heydari |
| 7,796,527 B2 | 9/2010 | Archer et al. |
| 7,835,378 B2 | 11/2010 | Wijnands et al. |
| 7,948,999 B2 | 5/2011 | Blocksome et al. |
| 7,974,221 B2 | 7/2011 | Tamassia et al. |
| 2002/0091819 A1 | 7/2002 | Melchione et al. |
| 2004/0034678 A1 | 2/2004 | Kuszmaul et al. |
| 2004/0073590 A1 | 4/2004 | Bhanot et al. |
| 2008/0022079 A1 | 1/2008 | Archer et al. |
| 2008/0263320 A1 | 10/2008 | Archer et al. |
| 2008/0263329 A1 | 10/2008 | Archer et al. |
| 2008/0301683 A1 | 12/2008 | Archer et al. |
| 2009/0006663 A1 | 1/2009 | Archer et al. |
| 2009/0037511 A1 | 2/2009 | Almasi et al. |
| 2009/0040946 A1 | 2/2009 | Archer et al. |
| 2009/0052462 A1 | 2/2009 | Archer et al. |
| 2009/0055474 A1 | 2/2009 | Archer et al. |
| 2009/0240838 A1 | 9/2009 | Berg et al. |
| 2009/0240915 A1 | 9/2009 | Faraj |
| 2009/0245134 A1 | 10/2009 | Archer et al. |
| 2009/0292905 A1 | 11/2009 | Faraj |
| 2009/0307467 A1 | 12/2009 | Faraj |
| 2010/0017420 A1 | 1/2010 | Archer et al. |
| 2010/0274997 A1 | 10/2010 | Archer et al. |
| 2011/0238950 A1 | 9/2011 | Archer et al. |
| 2011/0258245 A1 | 10/2011 | Blocksome et al. |
| 2011/0270986 A1 | 11/2011 | Archer et al. |
| 2011/0289177 A1 | 11/2011 | Archer et al. |
| 2011/0296137 A1 | 12/2011 | Archer et al. |
| 2011/0296139 A1 | 12/2011 | Archer et al. |
| 2012/0066284 A1 | 3/2012 | Archer et al. |
| 2012/0117361 A1 | 5/2012 | Archer et al. |
| 2012/0179881 A1 | 7/2012 | Archer et al. |
| 2012/0216021 A1 | 8/2012 | Archer et al. |

OTHER PUBLICATIONS

Office Action, U.S. Appl. No. 12/748,594, Sep. 14, 2012.
Office Action, U.S. Appl. No. 13/585,993, Oct. 11, 2012.
U.S. Appl. No. 13/672,740, Nov. 9, 2012.
U.S. Appl. No. 13/666,221, Nov. 1, 2012.
"Swap Two Variables Using XOR", BetterExplained.com (online), URL: http://betterexplained.com/articles/swap-two-variables-using-xor/, accessed Jan. 16, 2007, 11 pages.
Herbordt, M.C., Weems, C.C.; "Computing Parallel Prefix and Reduction Using Coterie Structures"; Frontiers of Massively Parallel Computation; 1992; Fourth Symposium; Oct. 19-21, 1992; pp. 141-149.
Fisher, et al.; "Computing The Hough Transform on a Scar Line Array Processor"; IEEE Transactions on Pattern Analysis and Machine Intelligence; vol. II, No. 3; Mar. 1989; pp. 262-265.
Office Action Dated Jul. 20, 2009 in U.S. Appl. No. 11/737,209.
Office Action Dated Sep. 4, 2009 in U.S. Appl. No. 11/843,090.
Notice of Allowance, U.S. Appl. No. 12/124,745, Mar. 6, 2013.
Final Office Action, U.S. Appl. No. 12/770,286, Jan. 29, 2013.
Final Office Action, U.S. Appl. No. 12/748,594, Mar. 22, 2013.
Notice of Allowance, U.S. Appl. No. 12/790,037, Mar. 15, 2013.
Final Office Action, U.S. Appl. No. 13/459,832, Jan. 4, 2013.
Notice of Allowance, U.S. Appl. No. 13/585,993, Jan. 31, 2013.
Office Action, U.S. Appl. No. 13/672,740, Apr. 2, 2013.

US 8,601,237 B2

PERFORMING A DETERMINISTIC REDUCTION OPERATION IN A PARALLEL COMPUTER

CROSS-REFERENCE TO RELATED APPLICATION

This application is a continuation application of and claims priority from U.S. patent application Ser. No. 12/790,037, filed on May 28, 2010.

STATEMENT REGARDING FEDERALLY SPONSORED RESEARCH OR DEVELOPMENT

This invention was made with Government support under Contract No. HR0011-07-9-0002 awarded by the Department of Defense. The Government has certain rights in this invention.

BACKGROUND OF THE INVENTION

1. Field of the Invention

The field of the invention is data processing, or, more specifically, methods, apparatus, and products for performing a deterministic reduction operation in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer may be composed of compute nodes and other processing nodes as well, including, for example, input/output ("I/O") nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes, as well as operating components (CPUs and the like) of compute nodes, may be organized in a network as a tree. In a tree network, nodes or components of nodes may be connected in a binary tree in which each node or component has a parent and two children (although some nodes or components may only have zero children or one child, depending on the hardware configuration). Other tree topologies include a branched tree topology in which a node or component of node has more than two children, and a highly branched tree topology in which one node has many children. Although a tree network typically is inefficient in point to point communication, a tree network does provide high bandwidth and low latency for certain collective operations, message passing operations where all compute nodes participate simultaneously, such as, for example, an allgather or allreduce operation.

SUMMARY OF THE INVENTION

Methods, apparatus, and products for performing a deterministic reduction operation in a parallel computer are disclosed. In embodiments of the present invention, the parallel computer includes a plurality of compute nodes where each compute node includes a plurality of computer processors and a CAU (Collectives Acceleration Unit). The CAU couples computer processors of compute nodes to one another for data communications in a cluster data communications network. Performing a deterministic reduction operation in accordance with embodiments of the present invention includes organizing a plurality of processors of the parallel computer and a CAU into a branched tree topology, where the CAU is a root of the branched tree topology and the processors are children of the root CAU; receiving, by the root CAU from each of the processors in the branched tree topology, in any order, dummy contribution data, where each processor is restricted from sending any other data to the root CAU prior to receiving an acknowledgement of receipt from the root CAU; sending, by the root CAU to the processors in the branched tree topology, in a predefined order, acknowledgements of receipt of the dummy contribution data; providing, by each processor, the processor's contribution data to the root CAU only after receiving an acknowledgement; receiving, by the root CAU from the processors in the predefined order, the processors' contribution data to the reduction operation; and reducing, by the root CAU, the processors' contribution data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
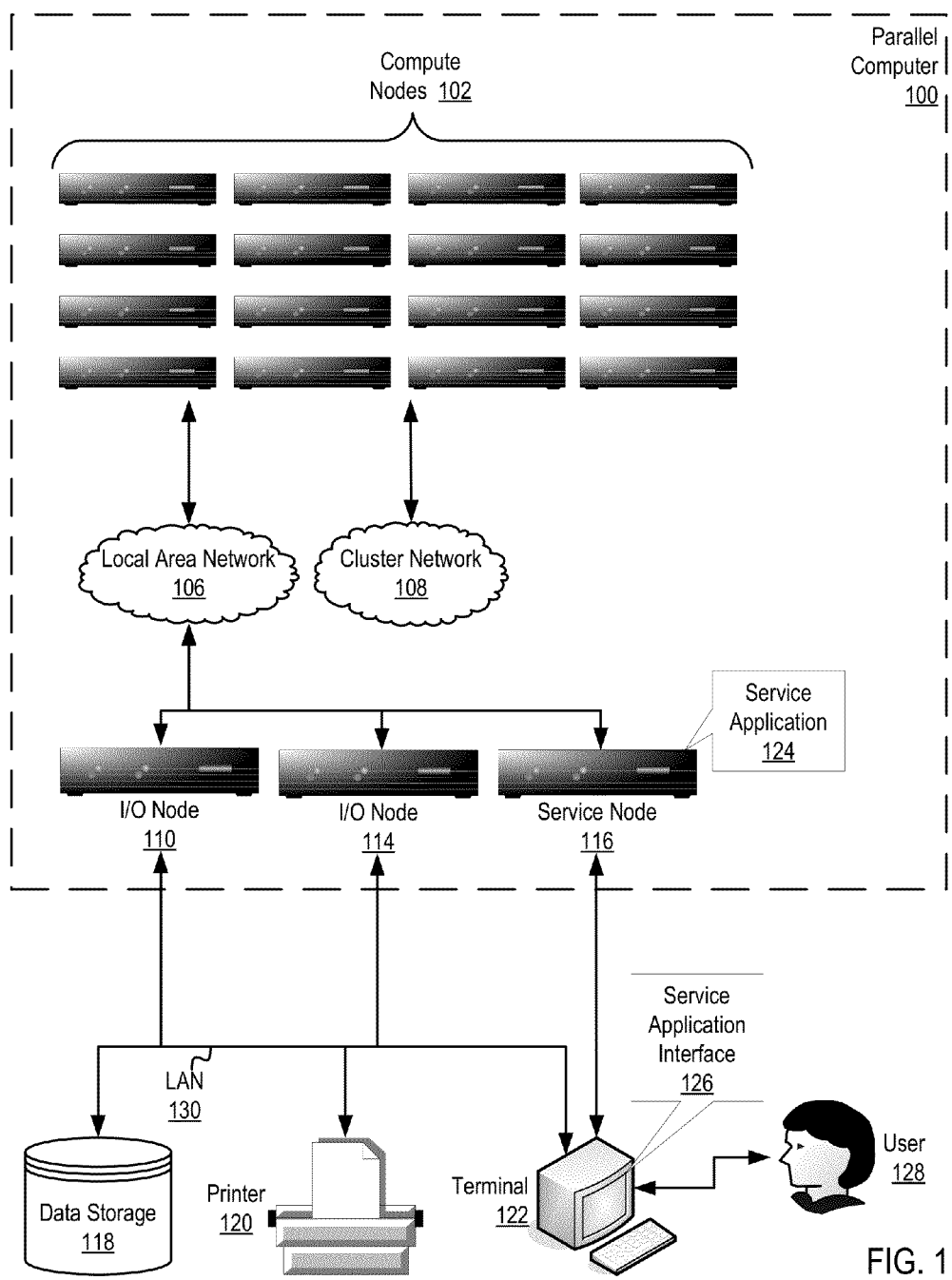
FIG. 1 illustrates an exemplary system for performing a deterministic reduction operation in a parallel computer according to embodiments of the present invention.

Exemplary methods, apparatus, and products for performing a deterministic reduction operation in a parallel computer in accordance with embodiments of the present invention are described with reference to the accompanying drawings, beginning with FIG. 1. FIG. 1 illustrates an exemplary system for performing a deterministic reduction operation in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by a cluster network (108) and a local area network (106). The cluster network (108) is a data communications network that configured such that the plurality of compute nodes (102) coupled to one another via the cluster network (108) may share resources, such as memory, computer processors, I/O bandwidth, and so on. Each compute node (102) includes a collective accelerations unit ('CAU'), a module of automated computing machinery comprising an aggregation of computer hardware and software that is configured to accelerate performance of collective operations performed by the compute nodes. Each CAU couples a compute node to at least one other CAU of another compute node for data communications. In this way, the CAU operates, from the perspective of a compute node, in a similar manner as a communications adapter of the compute node.

In addition to the cluster network (108) formed by links among the CAU of each compute node, the example compute nodes (102) of FIG. 1 are also coupled for data communications by a local area network ("LAN") (106). The LAN (106) may also couple the compute nodes to I/O Nodes (110, 114) and a service node (116). Each of the I/O nodes (110, 114) may provide I/O services between compute nodes (102) of and a set of I/O devices. In the example of FIG. 1, the I/O nodes (110, 114) are connected for data communications I/O devices (118, 120, and 122) through another LAN (130) implemented using high-speed Ethernet.

The service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In addition, components of the compute nodes (102), such as a processor or a CAU, may be organized into a tree topology for collective parallel operations on parallel computer (100). The components included in the tree topology upon which a collective parallel operation executes may be described as an operational group. Collective operations are implemented with data communications among the components of compute nodes of an operational group. Collective operations are those functions that involve all the components of compute nodes of an operational group. A collective operation is an operation, a message-passing computer program instruction that is executed simultaneously, that is, at approximately the same time, by all the components of compute nodes in an operational group. Collective operations are often built around point to point operations. A collective operation requires that all processes on all compute nodes having components within an operational group call the same collective operation with matching arguments. A 'broadcast' is an example of a collective operation for moving data among components of compute nodes of an operational group. A 'reduce' operation is an example of a collective operation that executes arithmetic or logical functions on data distributed among the components of compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a parallel computer. This specification sometimes uses MPI terminology for ease of explanation, although the use of MPI as such is not a requirement or limitation of the present invention.

Some collective operations have a single originating or receiving process running on a particular component of a compute node in an operational group. For example, in a 'broadcast' collective operation, the process on the component that distributes the data to all the other components in the operational group is an originating process. In a 'gather' operation, for example, the process on the component that received all the data from the other components is a receiving process. The component on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each component in the operational group. In scatter operation, all processes typically specify the same receive count. The send arguments are only significant to the root process, whose buffer actually contains sendcount *N elements of a given data type, where N is the number of processes in the given operational group of components. The send buffer is divided and dispersed to all processes (including the process on the logical root). Each component of the operation group is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked components into a receive buffer in a root component.

A reduce operation is also a many-to-one collective operation that includes an arithmetic or logical function performed on two data elements. All processes specify the same 'count' and the same arithmetic or logical function. After the reduction, all processes have sent count data elements from component send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

The system of FIG. 1 operates generally for performing a deterministic reduction operation in the parallel computer (100). The term 'deterministic' is used in this specification to describe a reduce operation as predictable, rather than variable. The term deterministic means an inevitable consequence of antecedent sufficient causes. The term deterministic is an antonym of the term 'stochastic' which means random or variable. In systems that perform reduce operations stochastically rather than deterministically, output of a sequence of reduce operations may be unpredictable.

The system of FIG. 1 performs a deterministic reduction operation by, first, organizing a plurality of processors of compute nodes (102) of the parallel computer (100) and a CAU into a branched tree topology. The CAU is a root of the branched tree topology and the processors are children of the root CAU. The root CAU may then receive, from each of the processors in the branched tree topology, in any order, dummy contribution data. Dummy contribution data as the term is used here refers to data that is not to be reduced by a CAU. In some embodiments, dummy contribution data is recognizable by the CAU as dummy data rather than actual contribution data to be reduced. Dummy contribution data may be configured to be recognizable in various ways, including, for example, by being included in a data communications packet having a header that identifies the data payload of the packet as dummy contribution data, being a particular value, including a particular error code, or in other ways as will occur to readers of skill in the art.

In the example of FIG. 1, each processor is restricted from sending any other data to the root CAU prior to receiving an acknowledgement of receipt from the root CAU. That is, after sending dummy contribution data to the CAU, the processor must wait to send actually contribution data until the CAU has sent, and the processor has received, and acknowledgment ('ACK'). In the system of FIG. 1, therefore, the root CAU, may send, to the processors in the branched tree topology, in a predefined order, acknowledgements of receipt of the dummy contribution data. Upon receipt of the acknowledgements, each processor may then provide the processor's contribution data to the root CAU. The root CAU may then receive the contribution data, the actual contribution data rather than the dummy contribution data, in the predefined order and reduce the processors' contribution data.

The arrangement of nodes, networks, and I/O devices making up the exemplary system illustrated in FIG. 1 are for explanation only, not for limitation of the present invention. Data processing systems useful in embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers configured according to embodiments of the present invention may include any number of compute nodes. In addition to Ethernet, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Performing a deterministic reduction operation in a parallel computer according to embodiments of the present invention may be generally implemented on a parallel computer that includes a plurality of compute nodes. In fact, such parallel computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer in which deterministic reductions are performed according to embodiments of the present invention. The compute node (152) of FIG. 2 includes at least one processor (156), in this example four processors (156). Each of the processors (156) includes eight processing cores (184). That is, in the example of FIG. 2, the compute node (152) includes four separate, 8-core central processing units ('CPUs') that operate together as a 32-way symmetric multiprocessing ('SMP') system. SMP is a computer hardware architecture in which two or more processors or processing cores are coupled to a shared main memory and are operate with a single operating system instance. Processors, or cores, configured for SMP may be interconnected using buses, crossbar switches, on-chip mesh networks, or in other ways as will occur to readers of skill in the art. SMP enables any processor or processing core to work on any task no matter where the data for that task is located in memory, provided that each task in the system is not in execution on two or more processors at the same time. With proper operating system support, SMP systems can easily move tasks between processors to balance the workload efficiently.

Figure 2:
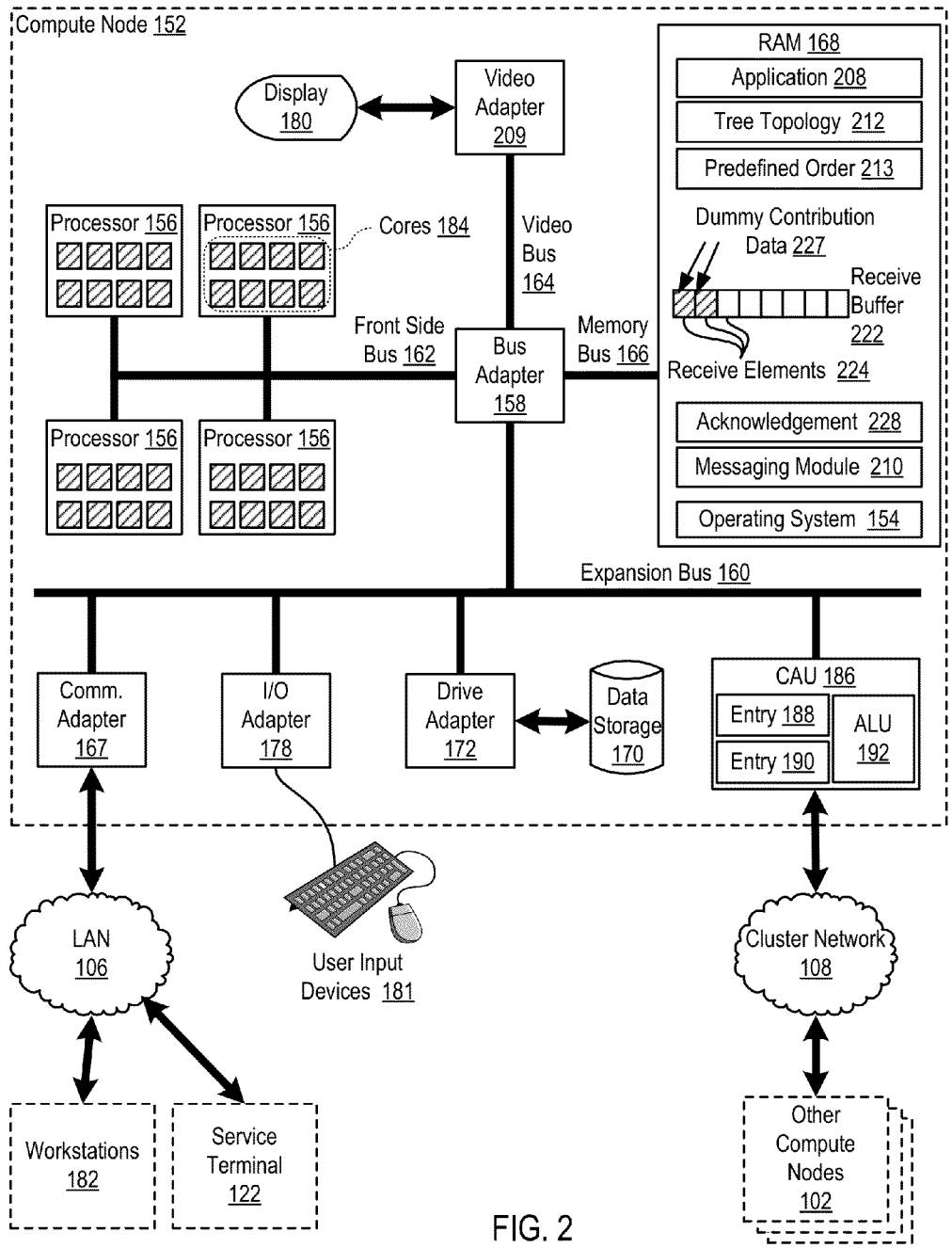
FIG. 2 sets forth a block diagram of an exemplary compute node useful in a parallel computer in which deterministic reductions are performed according to embodiments of the present invention.

The processing cores (184) in the example of FIG. 2 are coupled to random access memory (RAM') (168) through a high-speed memory bus (154), through a bus adapter (158), and through a front side bus (162). The processing cores are also coupled by expansion bus (160) to other components of the compute node (152). Stored in RAM (168) is an application program (208), a module of computer program instructions that carries out parallel, user-level data processing using parallel algorithms. Also stored in RAM (168) is a messaging module (210), a library of computer program instructions that carry out parallel communications among compute nodes, including collective operations. Application program (208) executes collective operations by calling software routines in the messaging module (210). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (168) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The example compute node (152) of FIG. 2 also includes a collective acceleration unit ('CAU') (186). The example CAU (186) is a module of automated computing machinery comprising an aggregation of computer hardware and software configured to accelerate collective operations processing by performing one or more arithmetic operations without use of a processor of the compute node (152). The CAU may include computer memory in any form, including, for example, RAM, EEPROM, registers, a local cache, and so on as will occur to readers of skill in the art. In the example of FIG. 2, the CAU (186) accelerates collective operations processing through use of an arithmetic logic unit ('ALU'). An ALU is a circuit, computer hardware, that performs arithmetic and logical operations. The ALU (192) in the example CAU (186) of FIG. 2 operates to accelerate collective operations processing by performing arithmetic and logical operations without the use of any processor (156). Computer program instructions of a collective operation in parallel communications library (210) may latch an instruction for an arithmetic or logical function into an instruction register of the ALU (192). When the arithmetic or logical function of a reduction operation is a 'sum' or a 'logical or,' for example, the ALU (192) of the CAU (186) may execute the arithmetic or logical operation without relying on a processor (156) to processes the function.

The CAU (186) in the example of FIG. 2 is also coupled for data communications to CAUs of other compute nodes (102) in a cluster network (108). The CAU may be coupled to CAUs of other compute nodes directly through a data communications link or through one or more network devices, such as routers, switches, and the like, comprising the cluster network (108) of FIG. 2. Processors (156) of compute nodes (152, 102) may use the CAUs (186) of compute nodes (152, 102) of the parallel computer to pass data communications messages to one other. In this way, the CAU (186) may operate as a type of communications adapter for the compute node (152). A processor (156) of compute node (152) may, for example, send a data communications message via the CAU (186) to a processor of another compute node (102), to a processor (156) of the same compute node (152), or to another CAU. CAUs themselves may be destinations of data communications messages.

In some embodiments, the CAUs communicate with one another and with processors in accordance with an acknowledgment-based data communications protocol or ACK-based data communications protocol. In embodiments in which CAUs perform data communications in accordance with an ACK-based protocol, a CAU, after sending a first chunk of data—such as a data communications packet—to a recipient, may be restricted from sending a second chunk, until the CAU receives an ACK (acknowledgement) from the recipient.

The CAU (186), as well as each processor (156), of the compute node (152) may be configured in a tree topology with other CAUs and other processors to carry out collective operations in the parallel computer of which the compute nodes (152, 102) are a part. In this specification, the collection of CAUs and processors comprising a tree topology may be referred to as an operational group for ease of explanation. A network topology is a specification of members included in a data communications network and the couplings among the members. A tree topology generally refers to an organization of members of the tree in which each member is coupled (logically or physically) to any combination of a parent and a child. In a binary tree, for example, most members have a parent and two children. In a branched tree, most members have more than two children and one or no parent. In a highly branched tree, a member may have many children; ten or twelve children, for example, and one or no parent. At the top of any tree topology is a root. When members of a tree topology operate to perform a collective operation, any member, including the root of the tree, may be a logical root. A logical root is a member of a tree having a buffer that is an origin of a collective operation or having a buffer that is a destination of results of a collective operation.

A tree network topology (212), as implemented by the parallel computer comprising the compute node (152) of FIG. 2, specifies processors and CAUs to be included in the tree and each processor and CAUs relative positions. A specification of a tree network topology (212) may be expressed in several ways, including, for example, by identifying each CAU's children and parent. In the example of FIG. 2, a tree network topology (212) may be specified by an application (208), the messaging module (210), by a service application executing on a service terminal (122), or by other modules of automated computing machinery.

Processors and CAUs included in a tree topology may be part of the same or different compute nodes. Consider, for example, a tree network topology comprising four compute nodes and a CAU, with the CAU configured as a root of the tree, and the processors configured as children of the root. To implement such a tree topology in the system of FIG. 2, the four processors (156) of the compute node (152) may be the children of the CAU (186), the four processor (156) of the compute node (152) may be the children of a CAU on another compute node (102), some processors (156) of the compute node (152) may be children of CAU (on this or another compute node) along with processors of another compute, and so on. That is, any processor or CAU in a parallel computer configured in accordance with embodiments of the present invention may be organized into a tree topology regardless of the compute node in which the processor or CAU is implemented.

In some embodiments, a tree network topology may be a physical tree topology in which CAUs and processors are physically coupled by data communications link in a manner specified by the network topology—a parent is coupled to children directly, with no intervening CAUs or processors, for example. In other embodiments, the tree network topology may be implemented logically, that is, CAUs and processors may or may not be physically coupled by data communications links in a manner specified by the network topology. Instead, CAUs and processors may be coupled by other CAUs—CAUs not even a part of the tree, in fact. That is, in logical tree network topologies, some CAUs not included in the topology, CAUs not included in the operational group, may pass along data communications to other CAUs and processors included in the logical tree network topology. Such CAUs, however, may not participate otherwise in the operations of the tree network topology. That is, CAUs not included in an operational group of a tree network may pass along data communications to members of the operational group, but may not otherwise participate in collective operations carried out by the operational group.

A CAU may be a member of one or more tree topologies at any time. In some embodiments, for example, a CAU may support—or said another way, be included in—up to 64 unique trees. For each tree that a CAU supports, the CAU includes two entries (188, 190). An entry is a region of computer memory configured to store an operation, such as a reduction operation or a multicast operation, or function that the CAU is to execute. In this way, some collective operations may be pipelined in a particular tree.

In some embodiments, however, the pipelining of collective operations is limited. In such embodiments, only collective operations travelling in the same direction, such as, for example, a sequence of several multicast operations originating from the same member of a tree or a sequence of several allreduce operations originating from the same set of members of the tree. That is, when data communications supporting a sequence of operations flow in the same direction—up or down a tree—the sequence of operations may be pipelined. When a collective operation in a sequence of operations changes the direction in which data communications will flow, however, the sequence is said to include a 'turn-around.' A collective operation that causes a turn-around is referred to here, for ease of explanation, as a turn-around operation. When such a turn-around occurs, members of the tree that are to be senders of data communications in processing the turn-around operation must wait until the previous operation is complete before processing the turn-around operation. Consider, for example, a sequence of broadcast operations originating at a root member of the tree followed by a reduce operation having a destination of reduction results at the same root member. In this example, the sequence of broadcast operations may be pipelined, and the reduce operation causes a turn-around. In the broadcast operations data flows down the tree, while in the reduction operation data flows up the tree. In this example, all children in the tree must wait until the broadcast operations are completed, before processing the reduce operation.

In the example of FIG. 2, several components of compute node (152) may operate together to perform a deterministic reduction in a parallel computer of which the compute node (152) is a part. In the example compute node (152) of FIG. 2, any of the messaging module (210), the user-level application (208), a service application executing on a service terminal (122) or other module of automated computing machinery not shown here may organize a plurality of processors (156) of the parallel computer and a CAU (186) into a branched tree topology (212), where the CAU (186) is a root of the branched tree topology (212) and the processors (156) are children of the root CAU (186).

The CAU may then receive, from each of the processors (156) in the branched tree topology (212), in any order, dummy contribution data (227). In the example of FIG. 2, the CAU receives the dummy contribution data (227) in a receive buffer (222), the same receive buffer configured to receive actual contribution data from the processors (156). The receive buffer (222) is depicted in the example of FIG. 2 as being implemented in RAM (168)—main memory of the compute node (152)—for clarity of explanation, not for limitation. The CAU (186) in FIG. 2 may access the RAM (168), and the receive buffer (222) stored in RAM (168), through the expansion bus (160), bus adapter (158), and memory bus (166). This, of course, is but one possible implementation among many of computer memory which may be accessible by the CAU (186). In other embodiments, for example, the CAU may be coupled to RAM (168) directly rather than through the expansion bus (160). In another example embodiment, the CAU (186) may be coupled with or include memory designated for use only by the CAU. In such an example embodiment, a receive buffer (222) may also be established in the memory of the CAU itself, rather than in main memory (168) of the compute node (152).

In the example system of FIG. 2, each processor (156) is restricted from sending any other data to the root CAU prior to receiving an acknowledgement (228) of receipt from the root CAU (186). The root CAU (186) may send, to the processors, in a predefined order (213), acknowledgements (228) of receipt of the dummy contribution data (227) and after receiving an acknowledgement (228) from the CAU (186), each processor (156) may provide the processor's contribution data to the root CAU (186). The root CAU (186) may receive, the processors contribution data in the predefined order (213) and reduce, the processors' contribution data.

The exemplary compute node (152) of FIG. 2 also includes a communications adapter (167) for implementing data communications with workstations (182), a service terminal (122), and other computers via a LAN (106). Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems that effect hardware acceleration of broadcast operations in a parallel computer according to embodiments of the present invention include modems for wired communications, Ethernet (IEEE 802.3) adapters for wired network communications, and 802.11b adapters for wireless network communications.

The data communications adapter (167) in the example of FIG. 2 may, for example, include a Gigabit Ethernet adapter that couples example compute node (152) for data communications to a Gigabit Ethernet LAN (106). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

Figure 3:
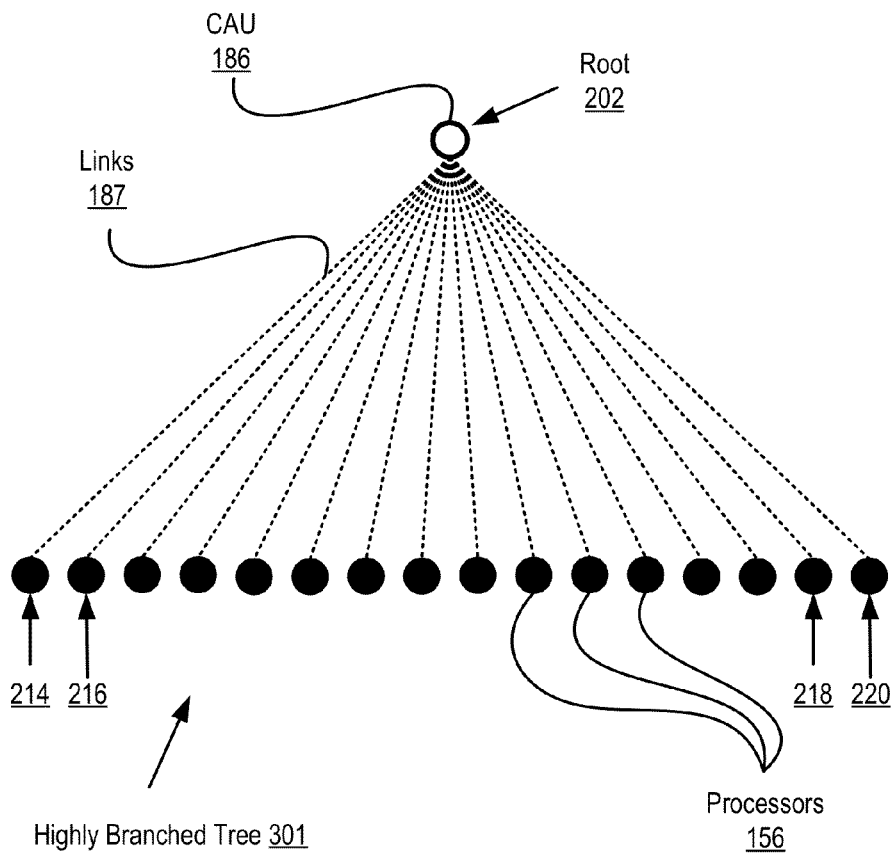
FIG. 3 sets forth a line drawing illustrating an exemplary tree network topology optimized for collective operations and useful in a system configured for performing a deterministic reduction operation in a parallel computer in accordance with embodiments of the present invention.

For further explanation, FIG. 3 sets forth a line drawing illustrating an exemplary tree network topology optimized for collective operations useful in a system configured for performing a deterministic reduction operation in a parallel computer in accordance with embodiments of the present invention. In the example of FIG. 3, sixteen processors (156) and one CAU (186) are organized into a tree network topology, more specifically a highly branched tree network topology (301). The tree (301) in the example of FIG. 3 is said to be 'highly' branched in that a root of the tree has many children, in this case sixteen, rather than two as in a binary tree, or three as in a less complex branched tree. Although a binary tree does have 'branches,' a binary tree is limited to two child branches per member of the tree and this specification the term 'branched' refers to trees with greater than two child branches. That is, a branched tree has at least three child branches.

The CAU (186) in the example of FIG. 3 is configured as a root (202) of the tree (301). The processors (156) are configured as children of the root (202) CAU (186). The members of the tree (301)—the operational group—in the example of FIG. 3 may be physically organized as a tree or, more likely, logically organized. As such, the links (187) coupling the processors (156) to the root (202) may physically comprise other components not seen here, including for example, other CAUs configured to pass data communications among the processors (156) and CAU (186), other network devices, such as routers and switches, and data communications cables.

The tree (301) may perform any number of collective operations, including, for example, a reduce operation that specifies a particular reduction operation to perform. Consider, as an example, a reduce operation in which contents of the processors' send buffers, referred to in this specification as contribution data, are to be passed to the root's (202) receive buffer and reduced by root (202) by summing the contents pair-wise. In this example, the contribution data may be said to flow 'up' the tree. By contrast, a broadcast operation in which contribution data is sent from the root (202) to the children processors (156) may be said to flow 'down' the tree.

In carrying out reduce operations with the highly branched tree (301) of FIG. 3, the processors (156) may provide contribution data (226) to the root (202) CAU (186) in any order. As depicted in FIG. 3, for example, four processors (214, 216, 218, and 220) have provided contribution data (226) to the root CAU (186). If the root (202) is configured to reduce the contribution data pair-wise as the contribution data is received, that is, stochastically rather than deterministically, upon each subsequent reduce operation, the order in which the root reduces contribution data may vary. Consider, as an example of performing reduction operations stochastically in the highly branched tree (301) of FIG. 3, two subsequent reduction operations. In the first reduction operation, the two processors (214, 216) on the far left of the tree may be the first to send their contribution data to the root (202) and, as such, the root (202) will reduce the contribution data of the two processors (214, 216) pair-wise, before any others. In the second reduction operation, the two processors (218, 220) on the far right of the tree (301) may be the first to send their contribution data to the root (202) and, as such, the root (202) will reduce the contribution data of the two processors (218, 220) pair-wise, before any others. That is, in this stochastic example, the root reduces the far left processors' (214, 216) contribution data first in the first example reduction operation, while in the second, the root reduces the far right processors' (218, 220) contribution data first. For various reasons, including for example, round-off techniques employed in carrying out floating point operations, this non-deterministic, stochastic approach may provide imprecise results over subsequent reduce operations.

The example highly branched tree (301) of FIG. 3, however, is configured for performing a deterministic reduction operation in a parallel computer in accordance with embodiments of the present invention. In the example of FIG. 3, The CAU (186) receives, from each of the processors in the branched tree topology (310), in any order, dummy contribution data. In the example of FIG. 3, each processor (156) is restricted from sending any other data to the root (202) CAU (186) prior to receiving an acknowledgement of receipt from the root CAU. The root (202) CAU (186) may then send, to the processors (156) in the branched tree topology (301), in a predefined order, acknowledgements of receipt of the dummy contribution data. Each processor (156) may then provide the processor's contribution data to the root (202) CAU (186), but only after receiving such an acknowledgement. The root (202) CAU (186) may receive, from the processors in the predefined order, the processors' (156) contribution data to the reduction operation and may reduce the processors' (156) contribution data.

Figure 4:
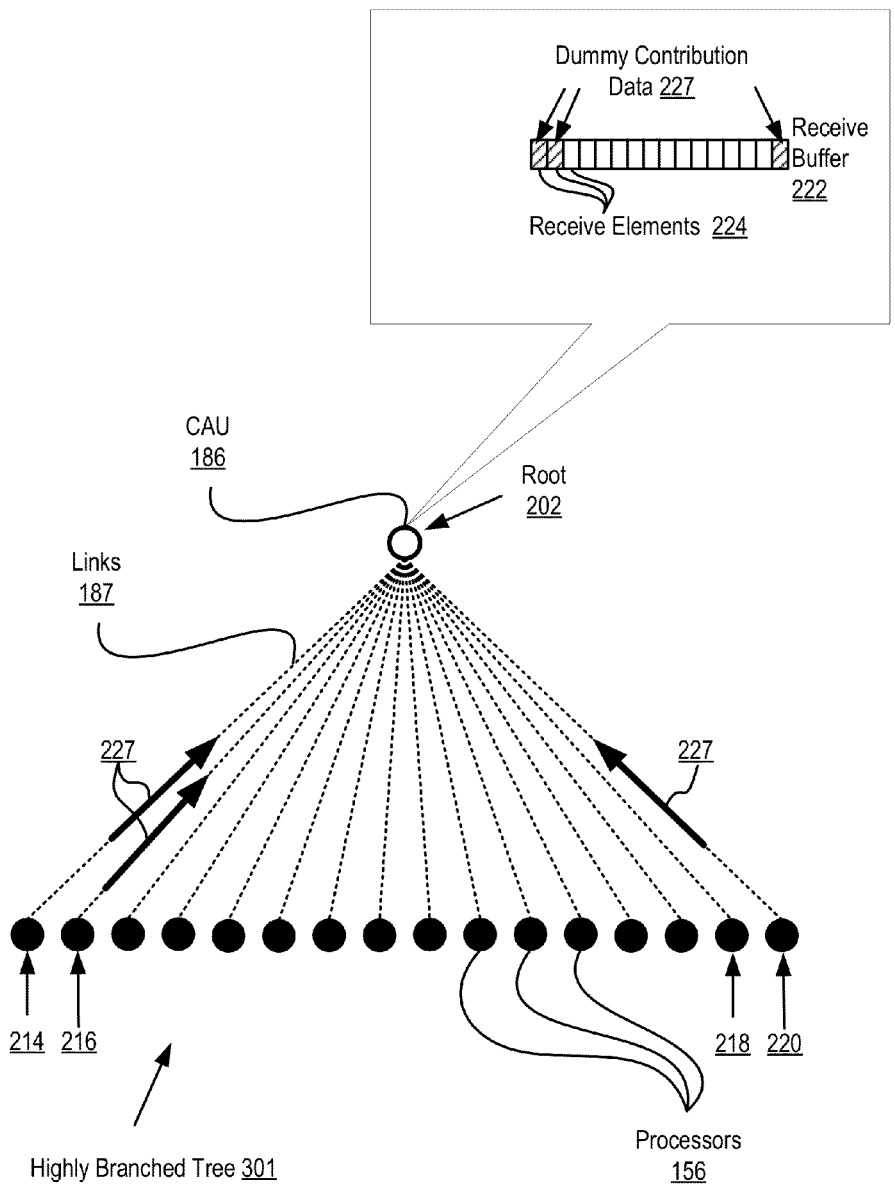
FIG. 4 sets forth a line drawing illustrating another exemplary tree network topology optimized for collective operations and useful in a system configured for performing a deterministic reduction operation in a parallel computer in accordance with embodiments of the present invention.
Figure 5:
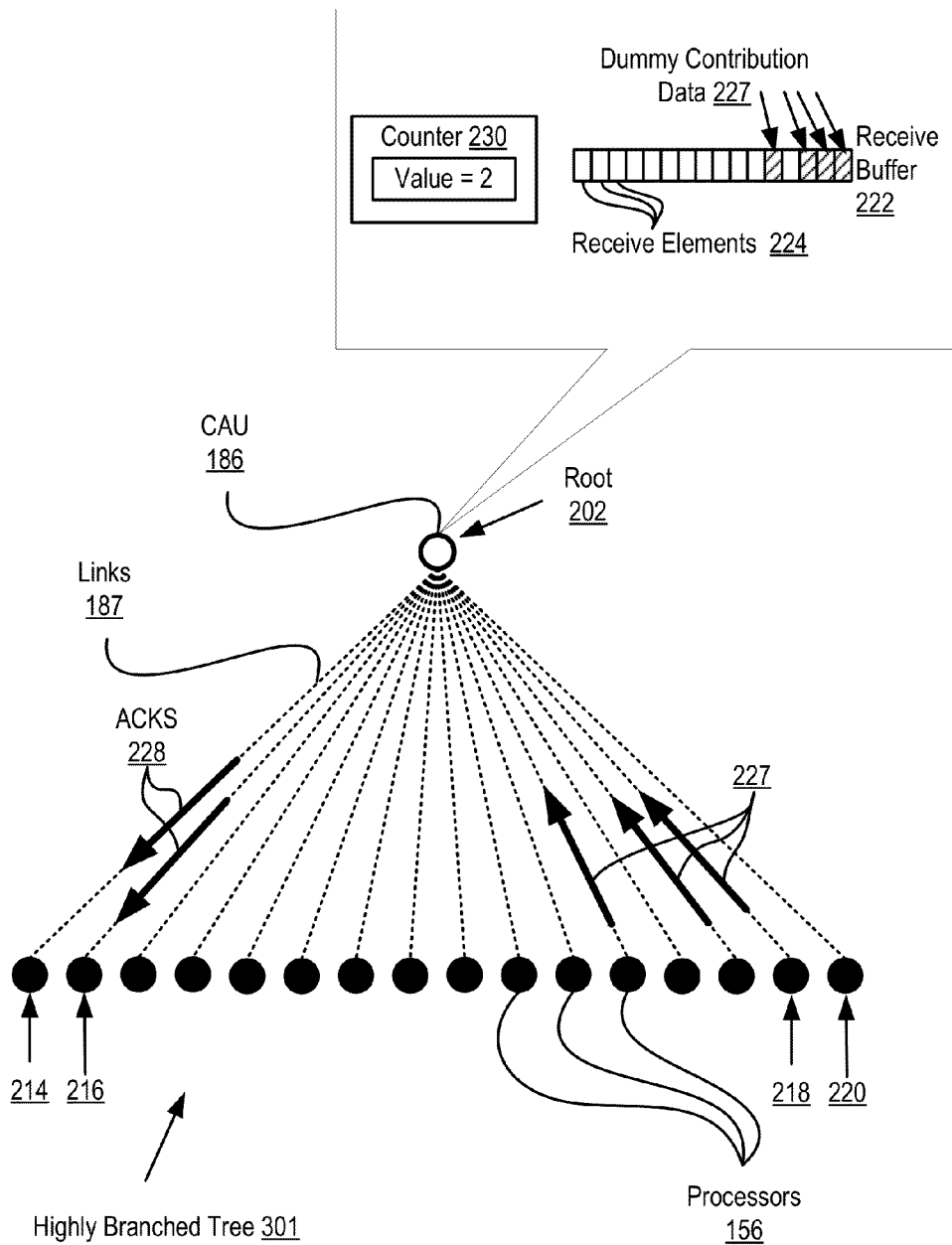
FIG. 5 sets forth a line drawing illustrating another exemplary tree network topology optimized for collective operations and useful in a system configured for performing a deterministic reduction operation in a parallel computer in accordance with embodiments of the present invention.
Figure 6:
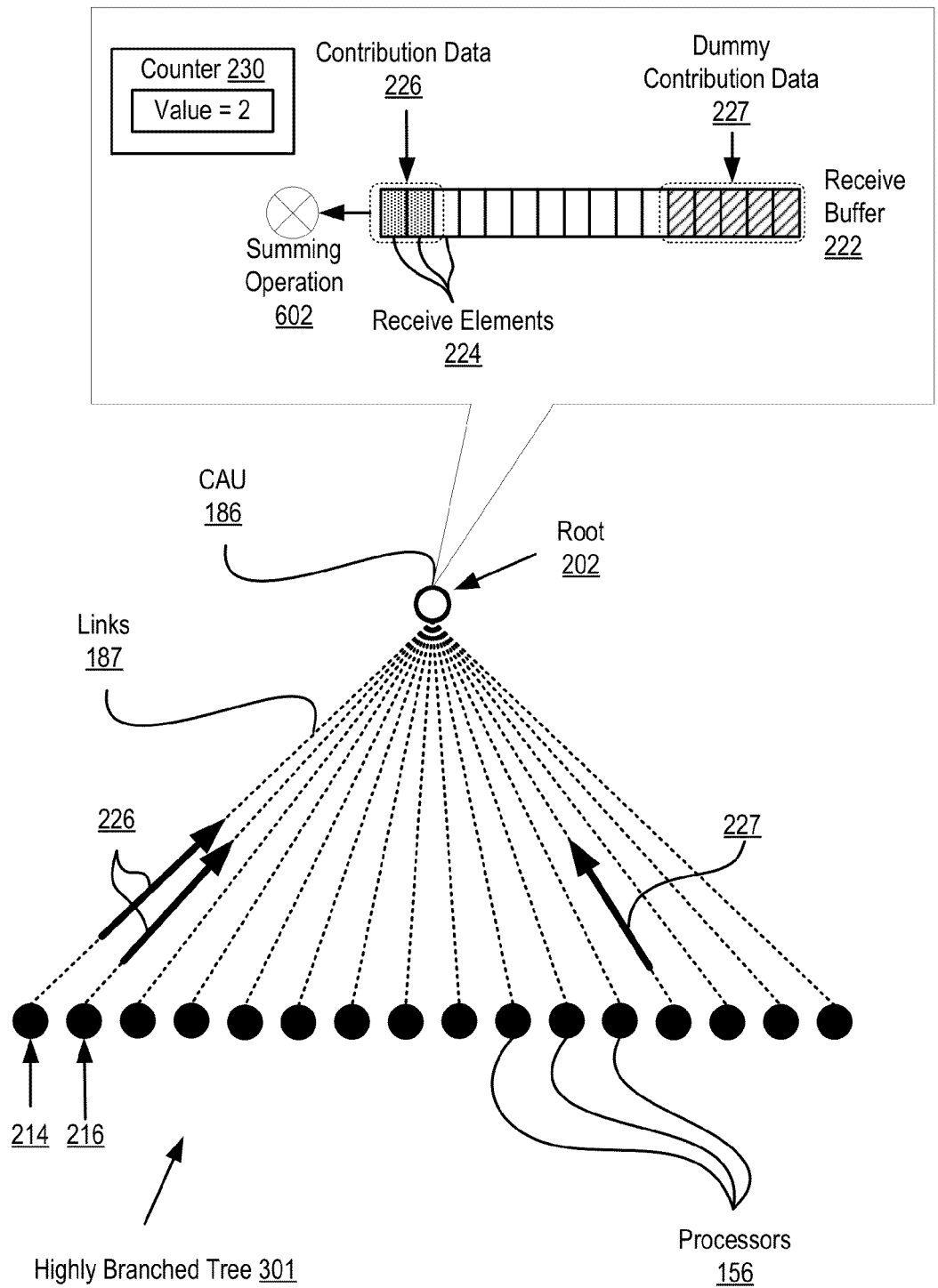
FIG. 6 sets forth a line drawing illustrating another exemplary tree network topology optimized for collective operations and useful in a system configured for performing a deterministic reduction operation in a parallel computer in accordance with embodiments of the present invention.

For further explanation, therefore, each of the FIGS. 4-6 sets forth a line drawing illustrating an exemplary tree network topology engaged in various steps of performing a deterministic reduction operation in a parallel computer in accordance with embodiments of the present invention. FIG. 4 depicts the example tree in preliminary stages of performing a deterministic reduction operation in accordance with embodiments of the present invention, FIG. 5 depicts the example tree in intermediate stages, and FIG. 6 depicts the tree completing the reduction operation.

More specifically, FIG. 4 sets forth a line drawing illustrating an exemplary tree network topology performing a deterministic reduction operation in a parallel computer in accordance with embodiments of the present invention in which the root CAU (202) receives, from each of the processors (156) in the branched tree topology (301), in any order, dummy contribution data (227). The root (202) CAU (186) receives the dummy contribution data (227) in receive elements (224) of a receive buffer (222). Each of the receive elements (224) is associated with one of the processors (156) in the example of FIG. 4. In this example, processors (214, 216, and 220) have sent along dummy contribution data (227) to the root (202) CAU (186). After sending dummy contribution data (227), a processor (156) in the example tree (301) of FIG. 4 is restricted from sending any other data to the root (202) CAU (186), until receiving an acknowledgment from the root (202) CAU (186).

After receiving the dummy contribution data (227), from one or more of the processors (156), the root CAU (186) may send acknowledgments to one or more of the processors (156). For further explanation therefore, FIG. 5 sets forth a line drawing illustrating the same exemplary tree network topology (301) of FIG. 4 performing the same deterministic reduction operation in accordance with embodiments of the present invention in which the root (202) CAU (186) sends acknowledgements (228) of receipt of the dummy contribution data (227) to the processors (156) in a predefined order. In the example of FIG. 5, the root CAU (186), in sending an ACK (228) to a processor (156), may first flush the processor's dummy contribution data (227) stored in the receive element (224) of the receive buffer (222) associated with the processor (156).

In the example of FIG. 5, the root (202) CAU (186) sends ACKs (228) in pairs—one to each of a pair of processors—as specified in the predefined order. In this example, processor (214) and processor (216) are specified as the first pair of processors in the predefined order. As such, the root (202) CAU (186) may send acknowledgements to the processors (214 and 216) after receiving dummy contribution data (227) from both the processors (214 and 216). In this embodiment, because the processors may send dummy contribution data in any order, the root CAU (186) may receive dummy contribution data (227) from many other processors (156) before receiving dummy contribution data (227) from the first pair of processors (214 and 216) as specified by the predefined order. In addition, the root (202) CAU (186) may also receive dummy contribution data (227) from other processors while sending along ACKs (228). In the system of FIG. 5, for example, three processors, including processor (218) are sending along dummy contribution data (227) to the root (202) CAU (186) while the root CAU sends along ACKs (228) to the first pair of processors (214, 216) in the predefined order.

Upon sending the ACKs (228), the root CAU (186) may also increment the value of a counter (230). The counter (230) may be used by the root CAU (186) to indicate when another ACK may be sent. In the system of FIG. 5 in which ACKs are sent in pairs, the CAU (186) may send a next pair of ACKs only if the value of the counter is a multiple of two. In another embodiment, the value of the counter (230) may be incremented only after receiving actual contribution data from a processor (156). In this way, a root CAU may be restricted from sending a subsequent ACK until a predefined number of processors (such as a pair, as in this example) sends along their actual contribution data.

In other embodiments, the root CAU (186) may send ACKs in the predefined order only after receiving dummy contribution data (227) from all processors in the branched tree topology. In such an embodiment, the root (202) CAU (186) increment the counter (230) upon receipt of dummy contribution data from each processor (156) and send AKCs (228) only after the counter equals the number of processors in the branched tree topology (301). In any of the above examples, the root (202) CAU (186) effectively controls order in which contribution data is to be reduced by controlling the order in which contribution data is received, or said another way, the order in which the contribution data is provided by the processors.

For further explanation therefore, FIG. 6 sets forth a line drawing illustrating the same exemplary branched tree topology (301) performing the same deterministic reduction operation in accordance with embodiments of the present invention in which each processor (156) provides the processor's contribution data (226) to the root (202) CAU (186) only after receiving an ACK (228). Once contribution data (226) is received by the root (202) CAU (186), the root (202) CAU (186) may then reduce the processors' contribution data. In the example of FIG. 6, the root CAU reduces the contribution data (226) by summing (602) the contribution data.

In the example of FIG. 6, the root (202) CAU (186) receives processors' contribution data (226) in receive elements (224) of the receive buffer (222), where each receive element (224) of the receive buffer (222) is associated with one of the processors (156) of the highly branched tree topology (301). In the example of FIG. 6, the root (202) CAU (186) is configured to receive such contribution data (226) and dummy contribution data (227) from separate processors concurrently. In the highly branched tree topology (301) of FIG. 6, for example, processors (214, 216) are providing contribution data (226) to the root (202) CAU (186), while another processor sends along dummy contribution data (227) to the root (202) CAU (186). This is, of course, but one way among many in which contribution data and dummy contribution data may be provided to a root CAU. In other embodiments, the root CAU may be configured to receive dummy contribution data from all processors (156) in the tree prior to sending along ACKs to the processors in a predefined order. In such an embodiment, the root CAU may also be configured to reduce contribution data in pairs as it is received. That is, the root may send to each of a pair of processors, an ACK, receive contribution data from each of the pair of processors, and reduce the contribution data before sending ACKs to a next pair of processors. For purposes of deterministic reduction operations carried out in accordance with embodiments of the present invention, it is enough that order, regardless of the actual implementation of that order, be enforced through use of ACKs.

Figure 7:
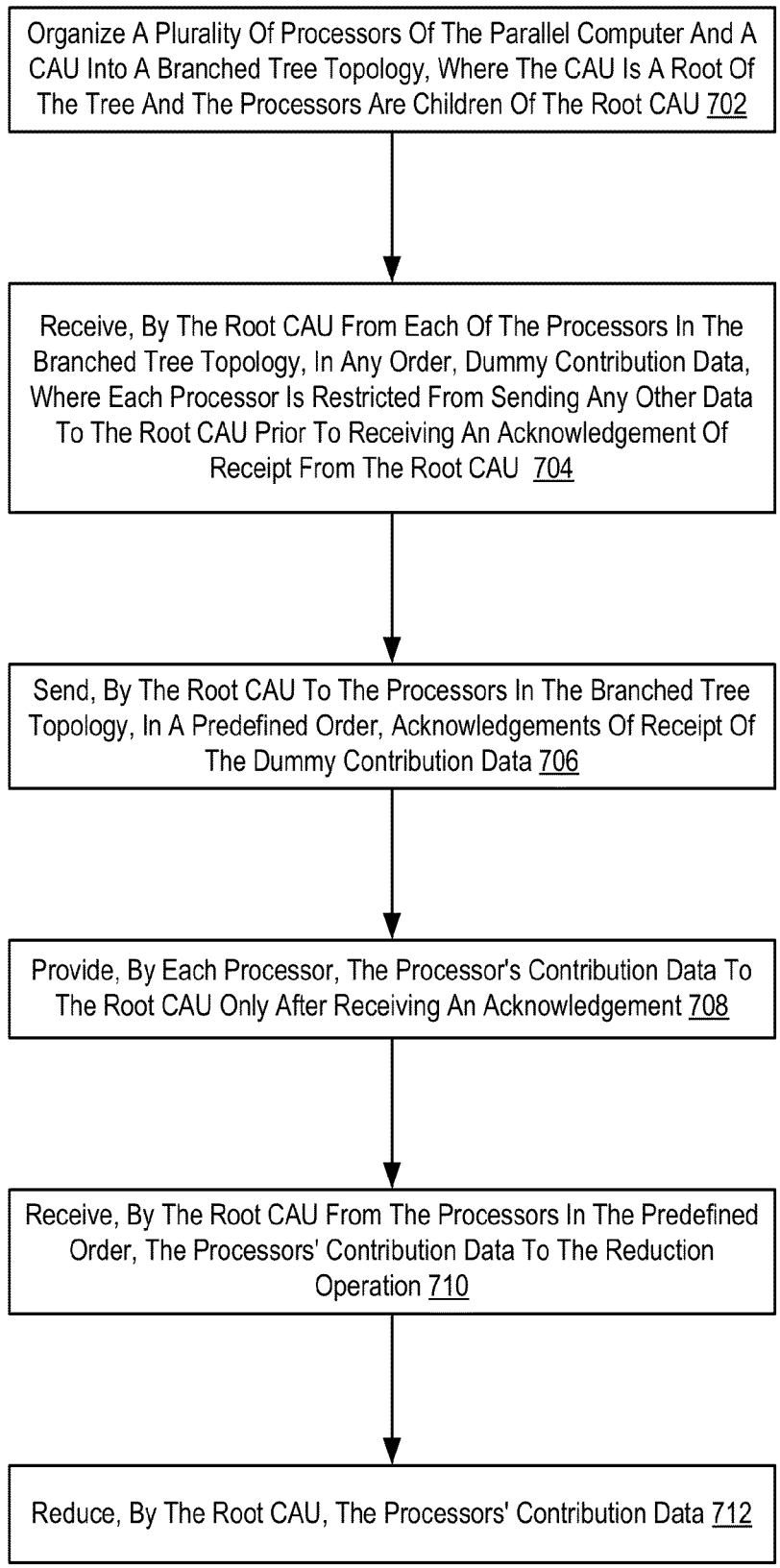
FIG. 7 sets forth a flow chart illustrating an exemplary method for performing a deterministic reduction operation in a parallel computer according to embodiments of the present invention.

For further explanation, FIG. 7 sets forth a flow chart illustrating a further exemplary method for performing a deterministic reduction operation in a parallel computer according to embodiments of the present invention. The method of FIG. 7 is carried out in a parallel computer that includes a plurality of compute nodes, with each compute node including a plurality of computer processors and a CAU (Collectives Acceleration Unit). The CAU couples computer processors of compute nodes to one another for data communications in a cluster data communications network.

The method of FIG. 7 includes organizing (702) a plurality of processors of the parallel computer and a CAU into a branched tree topology. In the method of FIG. 7, the CAU is a root of the branched tree topology and the processors are children of the root CAU. Organizing (702) a plurality of processors of the parallel computer and a CAU into a branched tree topology may be carried out by a messaging module, user-level application, CAU, operating system, or other module of automated computing machinery. Organizing (702) a plurality of processors of the parallel computer and a CAU into a branched tree topology may include specifying processors and CAUs to be included in the tree and each processor and CAUs relative position.

The method of FIG. 7 also includes receiving (704), by the root CAU from each of the processors in the branched tree topology, in any order, dummy contribution data. Receiving (704) dummy contribution data may include storing the dummy contribution data in a receive element of a receive buffer associated with the processor from which the dummy contribution data is received.

In the method of FIG. 7, each processor is restricted from sending any other data to the root CAU prior to receiving an acknowledgement of receipt from the root CAU. The method of FIG. 7 continues by sending (706), by the root CAU to the processors in the branched tree topology, in a predefined order, acknowledgements of receipt of the dummy contribution data. Sending (706) acknowledgements of receipt of the dummy contribution data may be carried out by sending a data communications packet with information stored in a header of the packet or with payload data indicating that the data communications packet is an ACK. Sending (706) acknowledgements of receipt of the dummy contribution data may also include flushing the processor's dummy contribution data from the receive buffer prior to sending the acknowledgment.

The method of FIG. 7 also includes providing (708), by each processor, the processor's contribution data to the root CAU only after receiving an acknowledgement and receiving (710), by the root CAU from the processors in the predefined order, the processors' contribution data to the reduction operation. Receiving (710), by the root CAU from the processors in the predefined order, the processors' contribution data to the reduction operation may also include, flushing the processor's dummy contribution data from the receive buffer if the dummy contribution data is not already flushed from the buffer.

The method of FIG. 7 also includes reducing (712), by the root CAU, the processors' contribution data. Reducing (712) contribution data may be carried out by performing an arithmetic operation, such as a sum or difference, or a logical operation such as a bitwise 'OR, with the contribution data.

Figure 8:
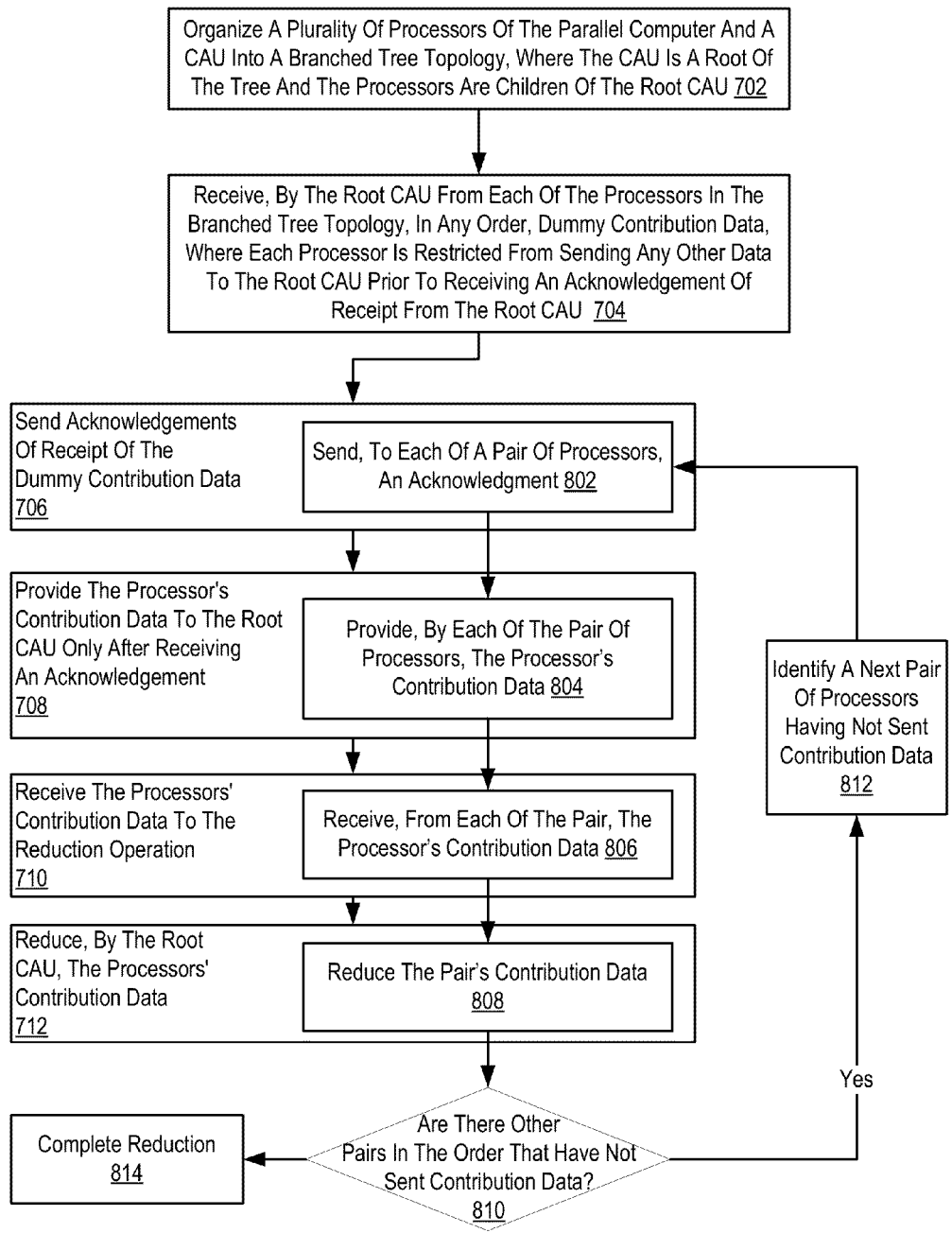
FIG. 8 sets forth a flow chart illustrating a further exemplary method for performing a deterministic reduction operation in a parallel computer according to embodiments of the present invention.

For further explanation, FIG. 8 sets forth a flow chart illustrating a further exemplary method for performing a deterministic reduction operation in a parallel computer according to embodiments of the present invention. The method of FIG. 8 is similar to the method of FIG. 7 in that method of FIG. 8 is also carried out in a parallel computer that includes a plurality of compute nodes, with each compute node including a plurality of computer processors and a CAU (Collectives Acceleration Unit). The CAU couples computer processors of compute nodes to one another for data communications in a cluster data communications network.

The method of FIG. 8 is also similar to the method of FIG. 7 in that the method of FIG. 8 includes organizing (702) a plurality of processors and a CAU into a branched tree topology; receiving (704) dummy contribution data; sending (706) acknowledgements to processors in a predefined order; providing (708) the processor's contribution data to the root CAU only after receiving an acknowledgement; receiving (710) the processors' contribution data; and reducing (712) the processors' contribution data.

The method of FIG. 8 differs from the method of FIG. 7, however, in that in the method of FIG. 8, sending (706) acknowledgements, providing (708) contribution data, receiving (710) the contribution data, and reducing (808) the contribution data is carried out iteratively, in pairs of processors, in the predefined order. That is, in the method of FIG. 8, sending (706) acknowledgements is carried out by sending (802) to each of a pair of processors, an acknowledgment in accordance with a predefined order. In this example, therefore, the predefined order, may specify an order of pairs of processors in addition to or rather than specifying an order of individual processors.

After sending (802) an acknowledgment to a pair of processors, the method of FIG. 8 continues by providing (708) the processor's contribution data to the root CAU only after receiving an acknowledgement. In the method of FIG. 8, providing (708) the processor's contribution data to the root CAU is carried out by providing (804) by each of the pair of processors, the processor's contribution data (804). Likewise, in the method of FIG. 8, receiving (710) the processors' contribution data is carried out by receiving, from each of the pair of processors, the processor's contribution data. In the method of FIG. 8, reducing (712) the processors' contribution data includes reducing (808) the pair of processors' contribution data.

The method of FIG. 8 then continues by determining (810) whether other pairs of processors in the predefined order have not sent contribution data. That is, in the method of FIG. 8, the root CAU effectively determines whether any other processors have yet to send contribution data. If there are no other pairs of the processors in the predefined order that have not sent contribution data, the method of FIG. 8 continues by completing the reduction operation (814). If there are other pairs of processors in the predefined order that have not sent contribution data to the root CAU, the method of FIG. 8 continues by identifying (812) a next pair of processors having not sent contribution data and again: sending (802) acknowledgments to the pair; providing (804), by the pair, the pair's contribution data; receiving (806) the pair's contribution data; and reducing (808) the pair's contribution data. This process may continue for all processors of the branched tree topology—send a pair of ACKs to a pair of processors, receive contribution data from the pair of processors, reduce the contribution data, send a next pair of ACKs, and so on for all processors in the tree.

Figure 9:
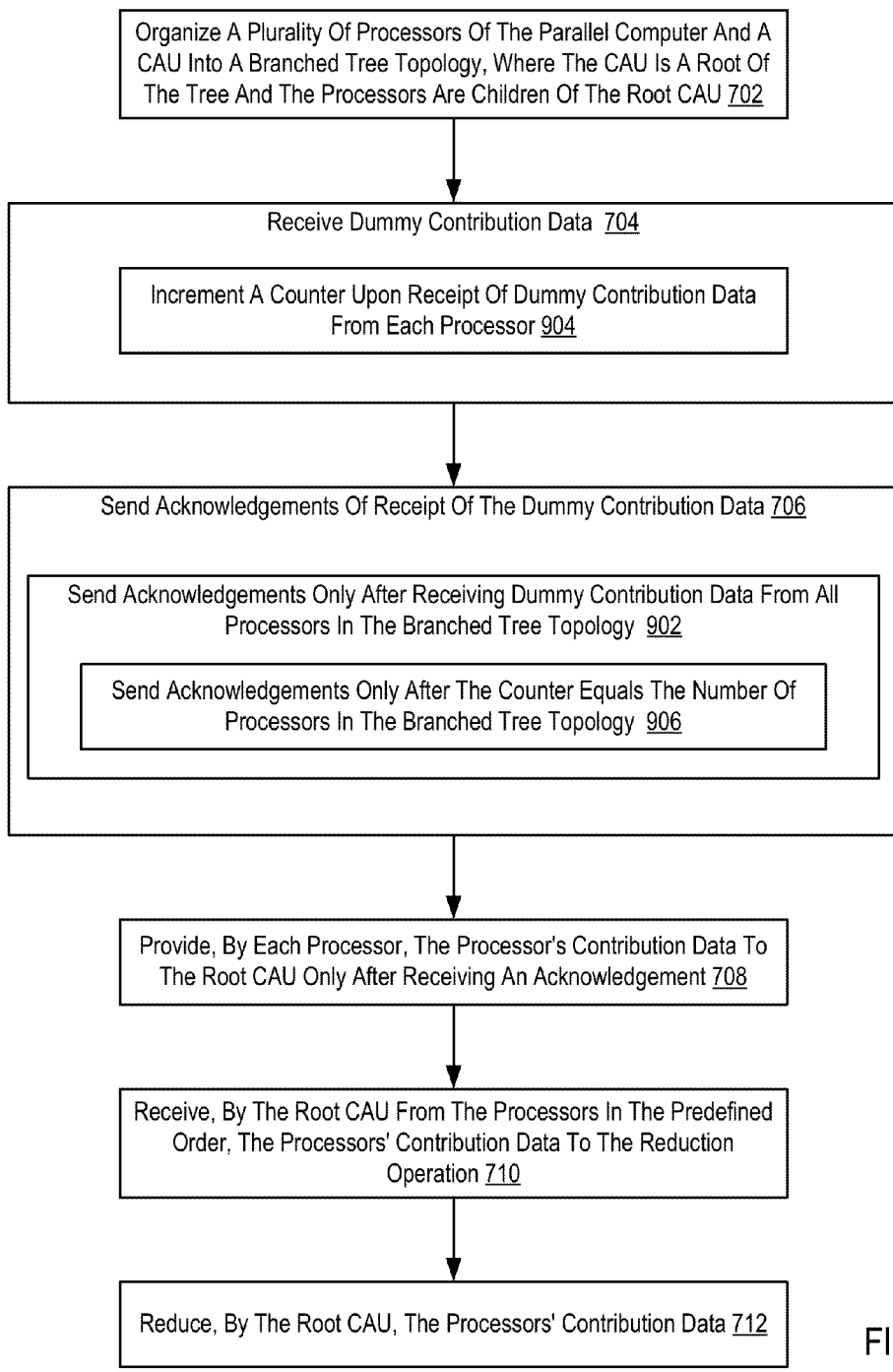
FIG. 9 sets forth a flow chart illustrating a further exemplary method for performing a deterministic reduction operation in a parallel computer according to embodiments of the present invention.

For further explanation, FIG. 9 sets forth a flow chart illustrating a further exemplary method for performing a deterministic reduction operation in a parallel computer according to embodiments of the present invention. The method of FIG. 9 is similar to the method of FIG. 7 in that method of FIG. 9 is also carried out in a parallel computer that includes a plurality of compute nodes, with each compute node including a plurality of computer processors and a CAU (Collectives Acceleration Unit). The CAU couples computer processors of compute nodes to one another for data communications in a cluster data communications network.

The method of FIG. 9 is also similar to the method of FIG. 7 in that the method of FIG. 9 includes organizing (702) a plurality of processors and a CAU into a branched tree topology; receiving (704) dummy contribution data; sending (706) acknowledgements to processors in a predefined order; providing (708) the processor's contribution data to the root CAU only after receiving an acknowledgement; receiving (710) the processors' contribution data; and reducing (712) the processors' contribution data.

The method of FIG. 9 differs from the method of FIG. 7, however, in that in the method of FIG. 9, receiving (704) dummy contribution data includes incrementing (904) a counter upon receipt of dummy contribution data from each processor and sending (706) acknowledgements of receipt of the dummy contribution data is carried out by sending (902) acknowledgements only after receiving dummy contribution data from all processors in the branched tree topology. In the method of FIG. 9, sending (902) acknowledgements only after receiving dummy contribution data from all processors in the branched tree topology is carried out by sending (906) acknowledgements only after the counter equals the number of processors in the branched tree topology.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of performing a deterministic reduction operation in a parallel computer, the parallel computer comprising a plurality of compute nodes, each compute node comprising a plurality of computer processors and a Collectives Acceleration Unit (CAU), the CAU coupling computer processors of compute nodes to one another for data communications in a cluster data communications network, the method comprising:

organizing a particular plurality of processors of a particular plurality of compute nodes of the parallel computer and a root CAU into a branched tree topology, wherein the root CAU comprises a root of the branched tree topology and the particular plurality of processors comprise children of the root CAU;

receiving, by the root CAU from each of the processors in the particular plurality of processors of the branched tree topology, in any order, dummy contribution data, wherein each processor of the particular plurality of processors is restricted from sending any other data to the root CAU prior to receiving an acknowledgement of receipt from the root CAU;

sending, by the root CAU to the processors in the branched tree topology, in a predefined order, acknowledgements of receipt of the dummy contribution data;

providing, by each processor in the branched tree topology, contribution data to the root CAU only after receiving an acknowledgement;

receiving, by the root CAU from the processors in the branched tree topology in the predefined order, the contribution data to the reduction operation; and reducing, by the root CAU, the received contribution data.

2. The method of claim 1 wherein sending acknowledgements of receipt of the dummy contribution data, providing the contribution data, receiving the contribution data, and reducing the contribution data is carried out iteratively, in pairs of processors, in the predefined order.

3. The method of claim 1 wherein sending acknowledgements of receipt of the dummy contribution data further comprises sending acknowledgements only after receiving dummy contribution data from all of the processors in the branched tree topology.

4. The method of claim 1 wherein:

receiving dummy contribution data further comprises incrementing a counter upon receipt of dummy contribution data from each processor of the branched tree topology; and sending acknowledgements only after receiving dummy contribution data from all processors in the branched tree topology further comprises sending acknowledgements only after the counter equals the number of processors in the branched tree topology.

5. The method of claim 1 wherein each processor comprises an 8-core central processing unit (CPU), each compute node comprises four processors, and the four processors of each node comprise a 32-way symmetric multiprocessing system (SMP).

6. The method of claim 1 wherein each CAU further comprises an arithmetic logic unit (ALU) and is configured to accelerate collective operations processing by performing one or more arithmetic operations without use of a processor of a compute node.

* * * * *